(12) United States Patent
Senga et al.

(10) Patent No.: US 9,319,275 B2
(45) Date of Patent: Apr. 19, 2016

(54) COMMUNICATION DEVICE, COMMUNICATION METHOD, AND COMMUNICATION PROGRAM

(75) Inventors: Satoshi Senga, Osaka (JP); Yuusaku Ohta, Osaka (JP); Shinichiro Nishioka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 248 days.

(21) Appl. No.: 14/122,507

(22) PCT Filed: Apr. 27, 2012

(86) PCT No.: PCT/JP2012/002898
§ 371 (c)(1),
(2), (4) Date: Nov. 26, 2013

(87) PCT Pub. No.: WO2013/014834
PCT Pub. Date: Jan. 31, 2013

(65) Prior Publication Data
US 2014/0082163 A1    Mar. 20, 2014

(30) Foreign Application Priority Data

Jul. 25, 2011 (JP) ................................. 2011-162002

(51) Int. Cl.
*G06F 15/177* (2006.01)
*H04L 12/24* (2006.01)
(Continued)

(52) U.S. Cl.
CPC .......... *H04L 41/0866* (2013.01); *H04L 67/141* (2013.01); *H04W 84/20* (2013.01); *H04W 4/008* (2013.01); *H04W 12/08* (2013.01)

(58) Field of Classification Search
None
See application file for complete search history.

(56) References Cited

U.S. PATENT DOCUMENTS

2001/0038422 A1    11/2001   Yamada et al.
2003/0189939 A1*   10/2003   Dauchy et al. ................ 370/401
(Continued)

FOREIGN PATENT DOCUMENTS

EP           2239992 A2    10/2010
JP        2001-245225 A     9/2001
(Continued)

OTHER PUBLICATIONS

Extended European Search Report for Application No. 12818009.8 dated Dec. 9, 2014.
(Continued)

*Primary Examiner* — John B Walsh
(74) *Attorney, Agent, or Firm* — Pearne & Gordon LLP

(57) ABSTRACT

An objective of the present invention is to determine a function of each communication apparatus with few steps. A first communication apparatus (100) is capable of carrying out at least one of a function of an apparatus which receives an access thereto from a second communication apparatus (200), and a function of a host which accesses the second communication apparatus (200). The first communication apparatus (100) comprises: an access request issuing unit (140) which issues a request which denotes the function thereof to the second communication apparatus (200); and a conflict assessment unit (150) which, either when the request and a request which the second communication apparatus (200) has issued conflict or when the request is rejected, makes the access request issuing unit (140) reissue a request to the second communication apparatus (200) which denotes another function.

5 Claims, 9 Drawing Sheets

(51) Int. Cl.
*H04L 29/08* (2006.01)
*H04W 84/20* (2009.01)
*H04W 12/08* (2009.01)
*H04W 4/00* (2009.01)

(56) References Cited

U.S. PATENT DOCUMENTS

| | | |
|---|---|---|
| 2004/0117507 A1* | 6/2004 | Torma ................ 709/248 |
| 2004/0203936 A1 | 10/2004 | Ogino et al. |
| 2006/0072525 A1 | 4/2006 | Hillyard et al. |
| 2010/0057882 A1 | 3/2010 | Yuen et al. |
| 2010/0254361 A1 | 10/2010 | Naito et al. |
| 2014/0365595 A1* | 12/2014 | Yamada et al. .......... 709/211 |

FOREIGN PATENT DOCUMENTS

| | | |
|---|---|---|
| JP | 2004-032552 A | 1/2004 |
| JP | 2007-215240 A | 8/2007 |
| JP | 2010-245847 A | 10/2010 |
| WO | 2010023513 A1 | 3/2010 |

OTHER PUBLICATIONS

International Search Report for Application No. PCT/JP2012/002898 dated Jun. 5, 2012.

* cited by examiner

| COMMAND TYPE | DATA |
| --- | --- |
| CONNECTION REQUEST | FIRST ROLE |
| CONNECTION REQUEST | SECOND ROLE |
| CONNECTION RESPONSE | APPROVAL |
| CONNECTION RESPONSE | REJECTION |
| DATA TYPE | ACTUAL DATA |

FIG. 3

COMMUNICATION DEVICE, COMMUNICATION METHOD, AND COMMUNICATION PROGRAM

TECHNICAL FIELD

The present invention relates to a communication apparatus, a communication method, and a communication program for determining roles necessary for performing data access with a remotely located different communication apparatus via communication.

BACKGROUND ART

In recent years, use cases via cooperation of apparatuses such as transferring a recorded content stored in a data storing part of a Blu-ray Disk (BD) recorder, for example, to a mobile terminal such as a cellular phone are about to become common.

As a transfer method according to a related art, a personal area network (PAN), which is based on wired communication such as a universal serial bus (USB) or bridge media such as an SD memory card have been widely used. However, in USB or the SD memory card, a cable connection or card insertion is necessary. Accordingly, from the viewpoint of the improvement in the usability of an apparatus, wireless connections between apparatuses have progressed in various fields.

In a use case that is premised on such a wireless connection, an apparatus on the other side is not limited to a stationary apparatus. Accordingly, in a mobile terminal, for example, an increase in opportunities to transfer content between the mobile terminal and an unspecified mobile terminal located at a visiting site is expected.

Each terminal serves a role of accessing the data storing part included in the other terminal (hereinafter, referred to as a "role as a host") or a role of allowing the other terminal to access the data storing part of the terminal (hereinafter referred to as a "role as a device"). In a session of such wireless communication, it is of significance which terminal serves the role as a host or the role as a device.

The reason for this is each mobile terminal includes almost the same functions and cannot fix its role to one of the roles in many cases. In addition, the role that each mobile terminal is capable of serving varies depending on the mobile terminal. Even for the same mobile terminal, the role that the same mobile terminal is capable of serving may vary depending on user settings, for example.

In this respect, as a related art for determining the role that is necessary for such an access, for example, there is a technique disclosed in Patent Literature (hereinafter, abbreviated as "PTL")1. According to this related art, communication apparatuses previously exchange functional information relating to the roles that the communication apparatuses are capable of serving, then compare the functional information with each other and determine the role of each one of the communication apparatuses based on a specific rule. In other words, according to the related art, each communication apparatus checks whether a communication apparatus on the other side can serve the role as a host or the role as a device via the exchange of functional information. Then, in the related art, the communication apparatus issues a request for serving any one of the roles based on the result of checking.

In such a related art, it is made possible to specify whether the communication on the other side can change the role or the like via the exchange of functional information in advance and to determine the roles of the apparatuses based on the information, whereby content transfer can be realized.

CITATION LIST

Patent Literature

PTL 1
Japanese Patent Application Laid-Open No. 2010-245847

SUMMARY OF INVENTION

Technical Problem

However, the related art has a problem in that there are many steps to be performed in advance. The reason for this is that, in the related art, the role of each communication apparatus cannot be determined without exchange of the functional information between communication apparatuses in advance. Involving many steps necessary for determining the roles of communication apparatuses leads to complication of the processes for establishing a session and also to an increase in the processing load, the communication load, and a time required for establishing a session. For this reason, it is desirable that the determination of the roles of communication apparatuses be performed using a small number of steps.

An object of the present invention is to provide a communication apparatus, a communication method, and a communication program that are capable of determining the role of each communication apparatus using a small number of steps.

Solution to Problem

A communication apparatus according to an aspect of the present invention is a communication apparatus including a data storing section and being capable of serving at least one of a role as a device for allowing another communication apparatus at a position remote from the communication apparatus to access the data storing section and a role as a host for accessing a data storing section included in the other communication apparatus, the communication apparatus including: an access control section that controls the role to be served by the communication apparatus; an access request issuing section that issues, to the other communication apparatus, a request that the communication apparatus serve one of the roles that the communication apparatus is capable of serving; an acquisition section that acquires, via the access control section, a request issued by the other communication apparatus and that acquires a response to the request issued by the access request issuing section; and a conflict determining section that reissues, to the other communication apparatus via the access request issuing section, a request that communication apparatus serve the other role in accordance with the roles that the communication apparatus is capable of serving, in at least one of a case where the request issued by the access request issuing section and the request issued by the other communication apparatus conflict with each other and a case where the request issued by the access request issuing section is rejected.

A communication method according to an aspect of the present invention is a method in a communication apparatus including a data storing section and being capable of serving at least one of a role as a device for allowing another communication apparatus at a position remote from the communication apparatus to access the data storing section and a role as a host for accessing a data storing section included in the other communication apparatus, the communication method including: issuing, to the other communication apparatus, a request that the communication apparatus serve one of the roles that the communication apparatus is capable of serving; acquiring a request issued by the other communication apparatus, and acquiring a response from the other communication apparatus to the request issued by the communication apparatus; determining whether or not the request issued by the communication apparatus and the request issued by the other communication apparatus conflict with each other; reissuing, to the other communication apparatus, a request that communication apparatus serve the other role in accordance with the roles that the communication apparatus is capable of serving, in at least one of a case where the request issued by the communication apparatus and the request issued by the other communication apparatus conflict with each other and a case where the request issued by the communication apparatus is rejected; and controlling the role to be served by the communication apparatus in accordance with the response from the other communication apparatus to the request issued by the communication apparatus.

A communication program according to an aspect of the present invention is a program causing a computer of a communication apparatus to execute processes, the communication apparatus including a data storing section and being capable of serving at least one of a role as a device for allowing another communication apparatus located at a position remote from the communication apparatus to access the data storing section and a role as a host for accessing a data storing section included in the other communication apparatus, the communication program causing the computer of the communication apparatus to execute the processes including: issuing, to the other communication apparatus, a request that the communication apparatus serve one of the roles that the communication apparatus is capable of serving; acquiring a request issued by the other communication apparatus, and acquiring a response from the other communication apparatus to the request issued by the communication apparatus; determining whether or not the request issued by the communication apparatus and the request issued by the other communication apparatus conflict with each other; reissuing, to the other communication apparatus, a request that communication apparatus serve the other role in accordance with the roles that the communication apparatus is capable of serving, in at least one of a case where the request issued by the communication apparatus and the request issued by the other communication apparatus conflict with each other and a case where the request issued by the communication apparatus is rejected; and controlling the role to be served by the communication apparatus in accordance with the response from the other communication apparatus to the request issued by the communication apparatus.

Advantageous Effects of Invention

According to the present invention, it is possible to determine the role of each communication apparatus using a small number of steps.

BRIEF DESCRIPTION OF DRAWINGS

FIG. 3 is a diagram that illustrates example contents of the transmission information according to this embodiment;

DESCRIPTION OF EMBODIMENT

Hereinafter, an embodiment of the present invention will be described in detail with reference to the drawings.

First, a configuration of a communication apparatus according to this embodiment will be described.

Figure 1:
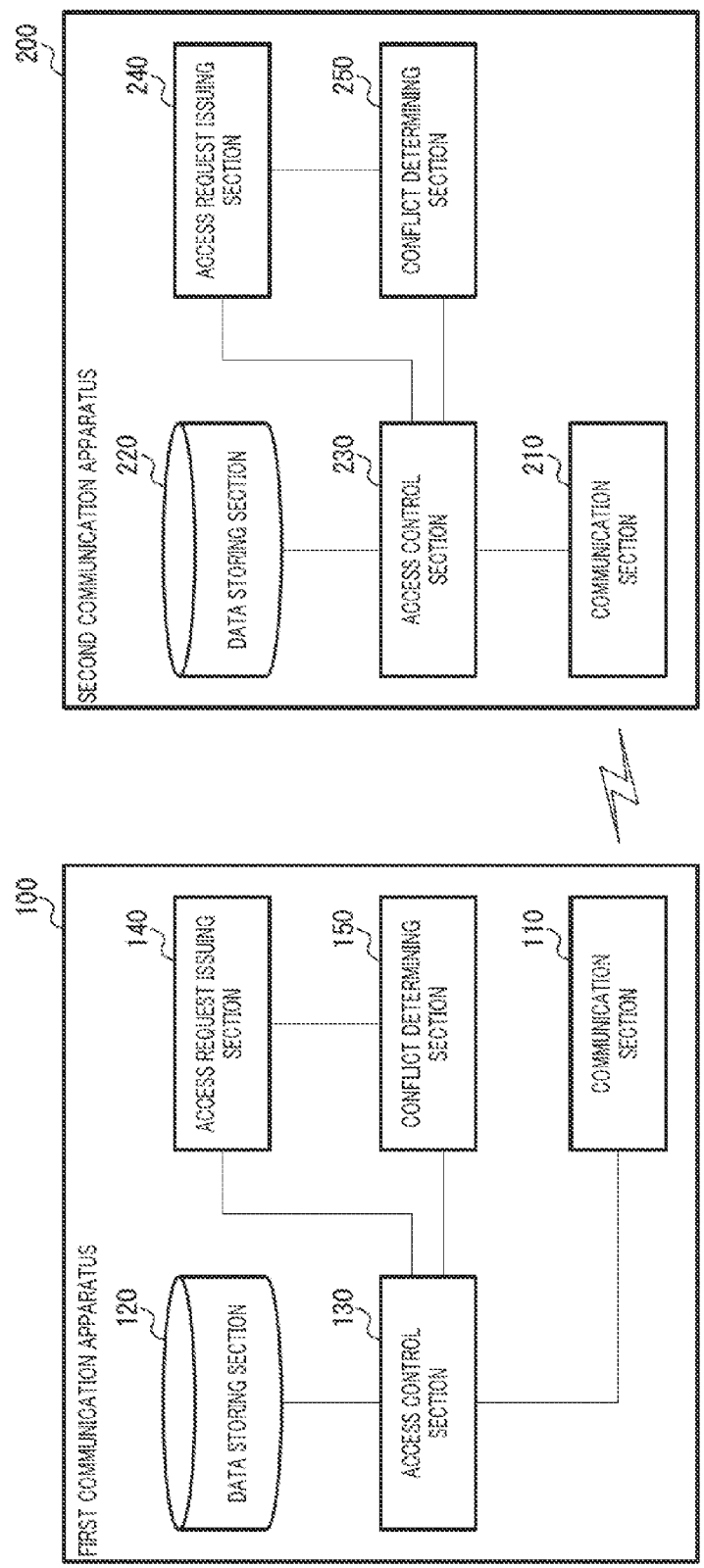
FIG. 1 is a block diagram that illustrates a configuration of a communication system including a communication apparatus according to an embodiment of the present invention.

FIG. 1 is a block diagram that illustrates the configuration of the communication system including two communication apparatuses according to this embodiment.

As illustrated in FIG. 1, first communication apparatus 100 according to this embodiment is a portable or stationary type apparatus which is about to start communication with second communication apparatus 200 at a position remote from first communication apparatus 100.

In the following description, out of a role as a host and a role as a device, the role requested first by first communication apparatus 100 as a role of first communication apparatus 100 to second communication apparatus 200 will be referred to as a "first role." In addition, the other one of the roles will be referred to as a "second role." Furthermore, a request issued by an apparatus that the apparatus serve the first role will be referred to as a "first request," and a request issued by an apparatus that the apparatus serve the second role will be referred to as a "second request." The first and second requests will be collectively referred to as "requests" as appropriate.

One or both of the roles that first communication apparatus 100 and second communication apparatus 200 are capable of serving are assumed to be appropriately changeable, for example, by user settings or the like. In this embodiment, first communication apparatus 100 is assumed to be capable of serving at least the first role.

As illustrated in FIG. 1, first communication apparatus 100 includes communication section 110, data storing section 120, access request issuing section 140, access control section 130, and conflict determining section 150.

Second communication apparatus 200 includes communication section 210, data storing section 220, access request issuing section 240, access control section 230, and conflict determining section 250. The functional sections respectively realize the same functions as those of communication section 110, data storing section 120, access request issuing section 140, access control section 130, and conflict determining section 150 of first communication apparatus 100. In other words, the configuration of second communication apparatus 200 is the same as that of first communication apparatus 100. Accordingly, the description of the configuration of second communication apparatus 200 will be omitted.

Communication section 110 transmits transmission information (command) to second communication apparatus 200 and receives a request issued by second communication apparatus 200 and a response to the transmission information (command). For example, communication section 110 transmits or receives transmission information having the contents of the first request, the second request, and responses to the requests to or from second communication apparatus 200. Communication section 110 is a wireless communication interface such as a wireless LAN device or a wireless gigabit (WiGig) device. Here, WiGig is a wireless communication standard using millimeter waves of a 60 GHz band as a replacement for the wired PAN exceeding 1 Gbps.

Data storing section 120 is a non-volatile recording medium on which data can be written or read. Examples of the non-volatile recording medium include an SD memory card, an SD high-capacity (SDHC) memory card, and an SD eXtended capacity (SDXC) memory card. Data storing section 120 is accessible from second communication apparatus 200 via communication section 110 and access control section 130 to be described later.

Access control section 130 controls the role that is served by first communication apparatus 100.

More specifically, access control section 130 identifies a command that is generated by access request issuing section 140 to be described later, switches the role of first communication apparatus 100 in accordance with the command, and transmits or receives data to or from second communication apparatus 200. In addition, access control section 130 transfer the request issued by second communication apparatus 200 to conflict determining section 150.

In order to establish a connection with second communication apparatus 200 (to determine the role), access request issuing section 140 issues, to second communication apparatus 200, a request that first communication apparatus 100 serve one of roles that first communication apparatus 100 is capable of serving.

More specifically, access request issuing section 140 generates a command that is used for requesting or notifying second communication apparatus 200 for or of connection as the first role or the second role. Then, access request issuing section 140 instructs access control section 130 to switch the role according to the generated command and transmit the generated command to second communication apparatus 200. In other words, in this embodiment, the "issuance" includes setting the role served by first communication apparatus 100 in accordance with a request and notifying second communication apparatus 200 of the request.

When determining the first role, access request issuing section 140 may previously determine one of the roles as a host or as a device to be the first role or may randomly select one of the roles to be the first role. Alternatively, the first role may be determined based on the IP address, MAC address, or the like of the terminal including access request issuing section 140.

Hereinafter, a command of the first request will be appropriately referred to as a "first request," and a command of a second request will be appropriately referred to as a "second request." Similar to first communication apparatus 100, second communication apparatus 200 is assumed to issue a first request or a second request.

Upon reception of a request issued by second communication apparatus 200, conflict determining section 150 determines whether or not a request issued by access request issuing section 140 and a request issued by second communication apparatus 200 conflict with each other. When these requests conflict with each other, conflict determining section 150 causes access request issuing section 140 to reissue a request to serve the other role in accordance with the role served by first communication apparatus 100.

More specifically, when first communication apparatus 100 and second communication apparatus 200 issue command almost simultaneously, conflict determining section 150 determines whether or not such commands (hereinafter, referred to as "two commands") conflict with each other. Then, when the two commands conflict with each other and first communication apparatus 100 can serve the second role, conflict determining section 150 causes access request issuing section 140 to dynamically switch the request to a request of the second role and to reissue the request.

The expression "issuing commands almost simultaneously" represents that first communication apparatus 100 receives a command from second communication apparatus 200 before receiving a response to the command issued by first communication apparatus 100. In addition, the expression "commands conflict with each other" represents that both of the commands are the first requests or the second requests.

In a case where access request issuing section 140 issues a request first, and the request is rejected, conflict determining section 150 causes access request issuing section 140 to reissue a request to serve the other role in accordance with the role that first communication apparatus 100 is capable of serving.

On the other hand, when second communication apparatus 200 issues a request first, conflict determining section 150 determines whether the role set in first communication apparatus 100 and the role desired in the request from second communication apparatus 200 conflict with each other. When the roles conflict with each other, conflict determining section 150 transmits a connection response indicating acceptance to second communication apparatus 200 in a case where the request for switching to the other role can be performed. On the other hand, in a case where switching to the other role cannot be performed, conflict determining section 150 transmits a connection response indicating rejection to second communication apparatus 200.

A situation in which two commands are issued almost simultaneously, for example, may occur at timing when each communication apparatus approaches from places where electric waves do not reach and then becomes communicable. In addition, the situation in which two commands are issued almost simultaneously, for example, may occur when one communication apparatus transitions from the power-off state or the sleep state to the power-on state or the standby state.

On the other hand, when the request issued by access request issuing section 140 and the request issued by second communication apparatus 200 do not conflict with each other, conflict determining section 150 causes access request issuing section 140 to accept the request from second communication apparatus 200. In other words, since it is determined that the requests from first communication apparatus 100 and second communication apparatus 200 do not conflict with each other based on a notification of the acceptance from conflict determining section 150, access request issuing section 140 accepts the set content.

In addition, when the two requests conflict with each other, and first communication apparatus 100 is capable of serving only the conflicting role, conflict determining section 150 waits for second communication apparatus 200 to issue a request for serving the role other than the conflicting role. Then, upon issuance of the request, conflict determining section 150 causes access request issuing section 140 to accept the request. In other words, access request issuing section 140 accepts the request as is because the other party changes the request and reissues a request and the content of the request reissued by second communication apparatus 200 is a request that does not involve any problem with first communication apparatus 100 in view of first communication apparatus 100.

First communication apparatus 100, for example, includes a central processing unit (CPU), a storage medium such as a read only memory (ROM) that stores a control program therein, and a working memory such as a random access memory (RAM). In this case, the function of each constituent section is realized by the CPU executing the control program.

Each functional section of first communication apparatus 100, for example, may be configured by an integrated circuit. Each functional section of first communication apparatus 100 may be configured as a single chip, or a plurality of functional sections thereof may be configured as a single chip. The integrated circuit may be configured by large scale integration (LSI), an integrated circuit (IC), system LSI, super LSI, ultra LSI, or the like depending on a difference in the degree of integration. In addition, the integrated circuit may be implemented by a dedicated circuit or a general-purpose processor. Furthermore, the integrated circuit may be a field programmable gate array (FPGA) that is programmable after manufacturing or a configurable processor in which the connection of internal circuit cells or the settings are reconfigurable. In addition, each functional section of first communication apparatus 100 may be realized through integration using another technology for configuring an integration circuit (for example, a biotechnology) replacing the LSI in accordance with the progress of semiconductor technology or other derivative technologies.

Although not illustrated in the figure, first communication apparatus 100 may include a user interface that is used by a user using first communication apparatus 100 for selecting and performing the operation of first communication apparatus 100. For example, first communication apparatus 100 may have functions of an input key, a display, a microphone, a speaker, a camera, a vibrator, a memory used for storing and executing a program, and the like as user interfaces.

Such first communication apparatus 100 can dynamically determine the role even when requests of first communication apparatus 100 and second communication apparatus 200 conflict with each other. As a result, first communication apparatus 100 can accurately determine the roles of first communication apparatus 100 and second communication apparatus 200 without exchanging capability information in advance. In other words, first communication apparatus 100 can establish a session with second communication apparatus 200 only using a small number of steps.

The configuration and the content of first communication apparatus 100 has been described thus far.

Next, the configuration of transmission information that is transmitted and received between first communication apparatus 100 and second communication apparatus 200 will be described.

Figure 2:
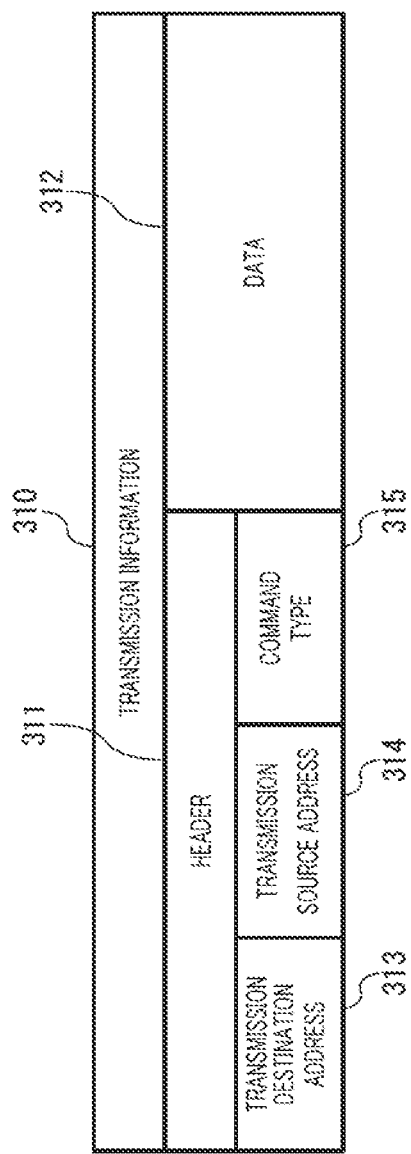
FIG. 2 is a diagram that illustrates an example of a configuration of transmission information according to this embodiment.

FIG. 2 is a diagram that illustrates an example of the configuration of the transmission information.

Transmission information 310 includes header 311, and data 312 of each type. Header 311 includes transmission destination address 313, transmission source address 314, and command type 315.

In transmission information 310 transmitted by first communication apparatus 100, the address of second communication apparatus 200 that is the destination is described in transmission destination address 313, and the address of first communication apparatus 100 that is the transmission source is described in transmission source address 314. For example, the address is a media access control (MAC) address used for identifying a communication device. In command type 315, information (command identification information) used for identifying a command, for example, is represented and described as information of several bits. In data 312, a detailed content accompanied with the command identification information, which is designated by command type 315, is set.

FIG. 3 is a diagram that illustrates example combinations of the content of command type 315 and the content of data 312 in this embodiment.

As illustrated in FIG. 3, as content 321 of command type 315, a "connection request" and a "connection response" responding thereto are used. As content 322 of data 312 corresponding to a "connection request," a "first role" and a "second role" are used. As content 322 of data 312 corresponding to the "connection response," "approval" and "rejection" are used. In other words, as transmission information 310 relating to requests and responses thereto, there are four patterns.

In order to discriminate between a first request and a second request, a command type of "reconnection request" may be added, or a flag indicating a reconnection request may be arranged in the connection request.

When data stored in data storing section 120 is transmitted and received after the establishment of a session, for example, the content of command type 315 is the "data type," and an area of "actual data" is formed in data 312.

Access request issuing section 140 generates transmission information 310 of the four patterns in accordance with necessary contents. In addition, conflict determining section 150 analyzes the pattern of transmission information 310 transmitted from second communication apparatus 200. The transmission information in which the "connection request" and the "first role" are set is the first request, and the transmission information in which the "connection request" and the "second role" are set is the second request.

The configuration and the content of the transmission information have been described thus far.

Next, the operation of first communication apparatus 100 will be described.

Here, the process performed until a result of session establishment or no-session establishment will be described.

Figure 4:
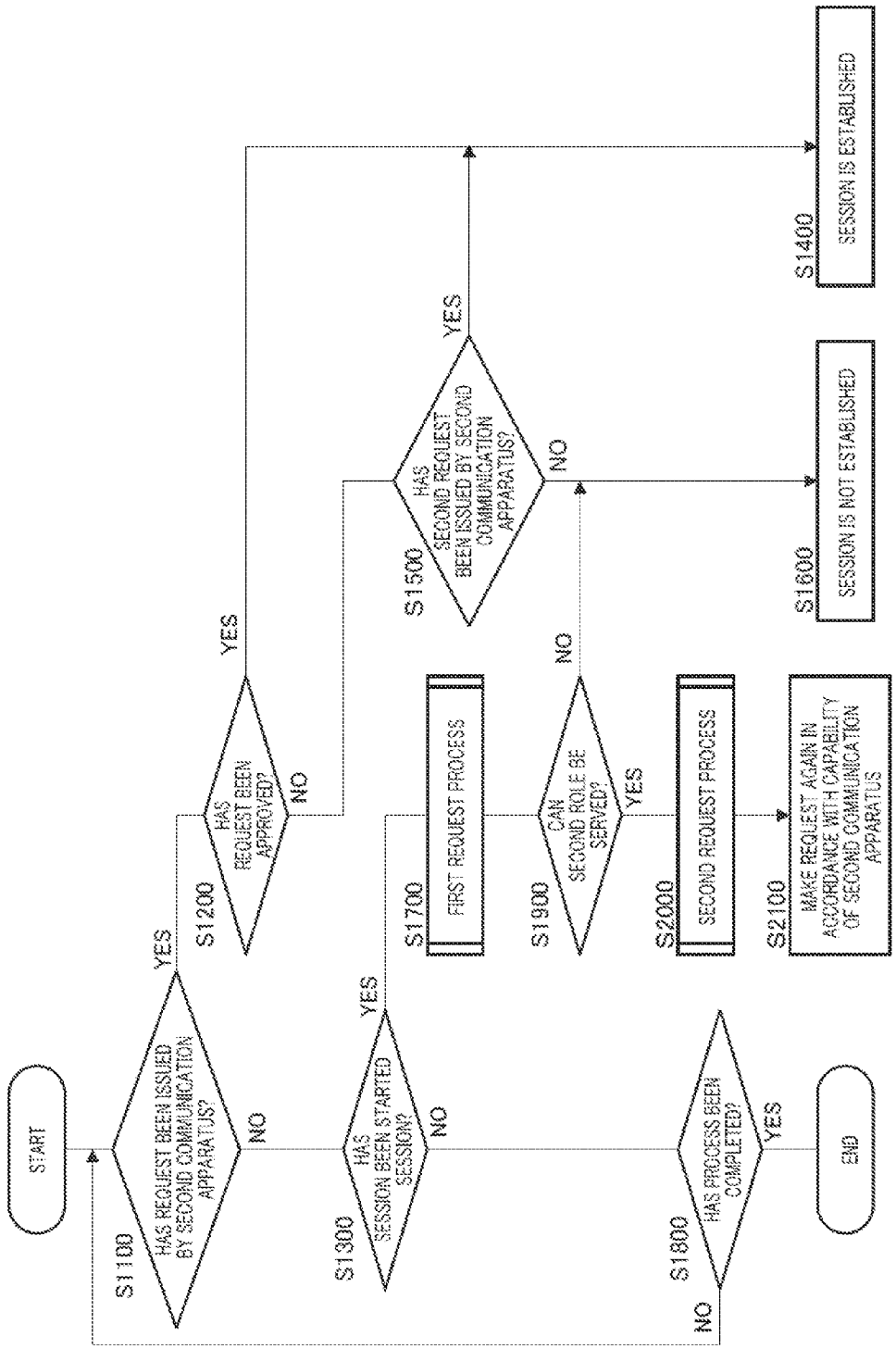
FIG. 4 is a flowchart that illustrates an example of an operation of the communication apparatus according to this embodiment.

FIG. 4 is a flowchart that illustrates an example of the operation of first communication apparatus 100.

First, in Step S1100, access control section 130 determines whether or not a request has been issued from second communication apparatus 200. The determination whether such a request has been issued can be performed based on whether or not the transmission information (see FIGS. 2 and 3) including a "connection request" has been received from second communication apparatus 200 via communication section 110.

In a case where the request has been received (Yes in Step S1100), access control section 130 transmits the received request to conflict determining section 150, and the process proceeds to Step S1200. On the other hand, in a case where no request has been received by access control section 130 (No in Step S1100), the process proceeds to Step S1300.

In Step S1200, conflict determining section 150 determines whether or not the received request is approvable. More specifically, conflict determining section 150 determines whether or not the role, which is requested to be served by second communication apparatus 200 in the request, conflicts with the role that first communication apparatus 100 is capable of serving. In other words, conflict determining section 150 determines whether or not the role to be served by second communication apparatus 200 is the role opposite to the role that first communication apparatus 100 is capable of serving.

In a case where the received request is approvable (Yes in Step S1200), conflict determining section 150 causes access request issuing section 140 to respond to second communication apparatus 200 via access control section 130 with a command representing a connection approval. Then, conflict determining section 150 causes the process to proceed to Step S1400.

On the other hand, in a case where the received request is not approvable (No in Step S1200), conflict determining section 150 causes access request issuing section 140 to respond to second communication apparatus 200 via access control section 130 with a command representing a connection rejection. Then, conflict determining section 150 causes the process to proceed to Step S1500.

In Step S1500, conflict determining section 150 waits for the issuance of the second request from second communication apparatus 200 until a predetermined time elapses. This predetermined time may be a random time that is based on a random number, a static time that is set in advance by a user using first communication apparatus 100, or the like.

In a case where the second request has been issued from second communication apparatus 200 (Yes in Step S1500), conflict determining section 150 causes the process to proceed to Step S1400. On the other hand, in a case where the second request has not been issued from second communication apparatus 200 (No in Step S1500), conflict determining section 150 causes the process to proceed to Step S1600 to be described later.

In Step S1400, access control section 130 appropriately switches the role served by first communication apparatus 100 in accordance with the command representing the connection approval. For example, it is assumed that the received request is a request for second communication apparatus 200 to serve the role of as a device and that the request is approved. In this case, access control section 130 causes first communication apparatus 100 to serve the role as a host. As a result, a session is established between first communication apparatus 100 and second communication apparatus 200.

In Step S1300, access control section 130 determines whether or not to start a session. For example, access control section 130 detects that an instruction to start a session is issued by user operation or that first communication apparatus 100 and second communication apparatus 200 approach close enough to allow wireless connection, for example. Then, access control section 130 determines to start a session. For example, whether or not a wireless connection can be established can be determined by detecting a radio signal transmitted by second communication apparatus 200.

When access control section 130 determines to start a session (Yes in Step S1300), access control section 130 notifies access request issuing section 140 of the start of a session, and the process proceeds to Step S1700. On the other hand, when not starting a session (No in Step S1300), access control section 130 causes the process to proceed to Step S1800.

In Step S1700, first communication apparatus 100 performs a first request process. The first request process is a process of issuing a first request.

Figure 5:
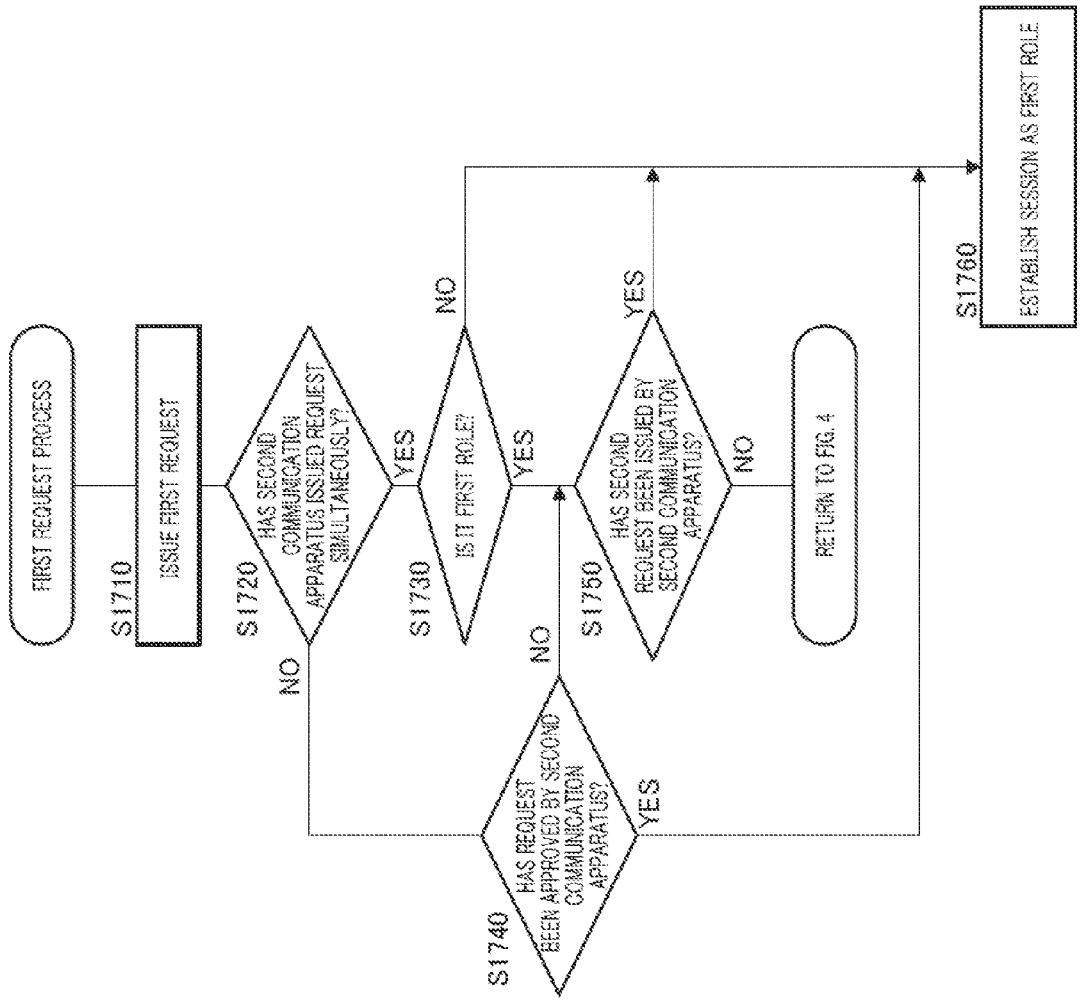
FIG. 5 is a flowchart that illustrates an example of a first request process according to this embodiment.

FIG. 5 is a flowchart that illustrates an example of the first request process (Step S1700 in FIG. 4).

First, in Step S1710, access request issuing section 140 generates and issues a first request command. As a result, access control section 130 sets the first role as the role of first communication apparatus 100 and transmits the first request command to second communication apparatus 200 via communication section 110.

Then, in Step S1720, conflict determining section 150 checks whether or not a request has been issued simultaneously from second communication apparatus 200. In other words, conflict determining section 150 determines whether or not the request that has been received from second communication apparatus 200 is transferred from access control section 130 before a response to the request issued in Step S1710. In a case where the request has been simultaneously issued (Yes in Step S1720), conflict determining section 150 causes the process to proceed to Step S1730. On the other hand, in a case where a request has not been simultaneously issued (in other words, in the case of a one-way request only from first communication apparatus 100) (No in Step S1720), conflict determining section 150 causes the process to proceed to Step S1740.

In Step S1730, conflict determining section 150 determines whether the role indicated by the request issued from second communication apparatus 200 is the first role (in other words, the roles conflict with each other).

In a case where the requested role is the first role (Yes in Step S1730), conflict determining section 150 causes the process to proceed to Step S1750. In addition, at this time point, access request issuing section 140 may send, as a response to the request from second communication apparatus, transmission information (see FIGS. 2 and 3) in which the "connection response" and "rejection" are set. In a case where the requested role is not the first role (in other words, in the case of the second role) (No in Step S1730), conflict determining section 150 causes the process to proceed to Step S1760 to be described later.

In Step S1740, conflict determining section 150 determines whether or not the first request issued by first communication apparatus 100 is approved by second communication apparatus 200. This determination may be made based on whether the transmission information representing the approval for the first request has been replied within a predetermined time. In a case where the first request has been approved (Yes in Step S1740), conflict determining section 150 causes the process to proceed to Step S1760 to be described later.

In Step S1750, conflict determining section 150 waits for the issuance of the second request from second communication apparatus 200 until a predetermined time elapses. This predetermined time may be a random time that is based on a random number, a static time that is set in advance by a user using first communication apparatus 100, for example.

In a case where the second request has been issued from second communication apparatus 200 (Yes in Step S1750), conflict determining section 150 causes the process to proceed to Step S1760. On the other hand, in a case where the second request has not been issued from second communication apparatus 200 (No in Step S1750), conflict determining section 150 returns the process to the process illustrated in FIG. 4.

In Step S1760, access control section 130 establishes a connection as the first role. In other words, first communication apparatus 100 maintains the role according to the first request issued by access request issuing section 140.

In Step S1900 represented in FIG. 4, conflict determining section 150 checks whether or not first communication apparatus 100 can serve the second role using access request issuing section 140.

In a case where first communication apparatus 100 cannot serve the second role (No in Step S1900), conflict determining section 150 causes the process to proceed to Step S1600. On the other hand, first communication apparatus 100 can serve the second role (Yes in Step S1900), conflict determining section 150 causes the process to proceed to Step S2000.

In Step S1600, conflict determining section 150 determines that a session cannot be established with second communication apparatus 200. The reason for this is that second communication apparatus 200 rejects the first request from first communication apparatus 100 or issues only the first request although first communication apparatus 100 is capable of serving only the first role.

Meanwhile, there is a possibility that second communication apparatus 200 accepts the first request from first communication apparatus 100 or issues a second request after the determination is made in the step described above. Accordingly, first communication apparatus 100 may be configured to repeat the process of Steps S1100, S1300, and S1800 after the determination of not establishing a session.

In Step S2000, first communication apparatus 100 performs a second request process. The second request process is a process of issuing a second request.

Figure 6:
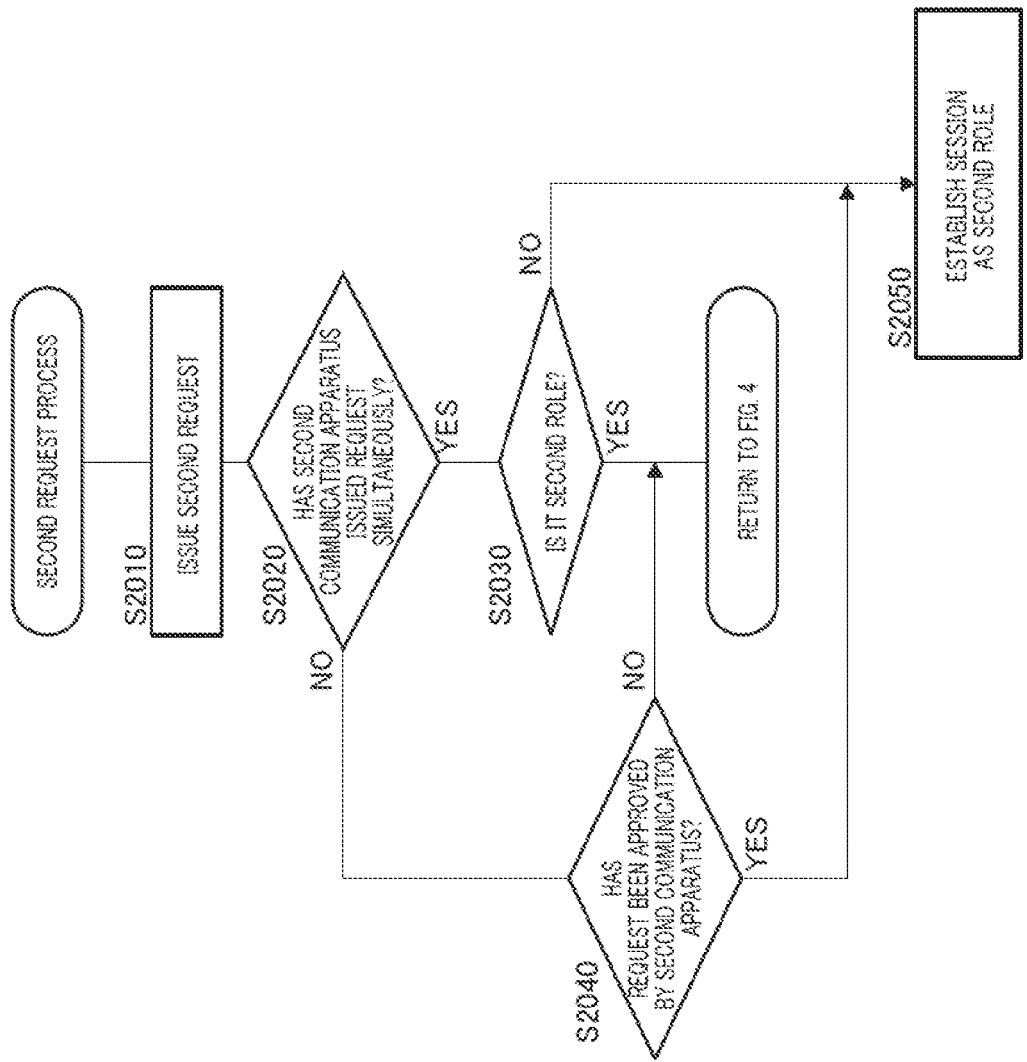
FIG. 6 is a flowchart that illustrates an example of a second request process according to this embodiment.

FIG. 6 is a flowchart that illustrates an example of the second request process (Step S2000 in FIG. 4).

First, in Step S2010, access request issuing section 140 generates and issues a second request command. As a result, access control section 130 sets the role of first communication apparatus 100 to be switched from the first role to the second role and transmits the second request command to second communication apparatus 200 via communication section 110.

Then, in Step S2020, conflict determining section 150 checks whether or not the request has been simultaneously issued from second communication apparatus 200. In a case where the request has been simultaneously issued (Yes in Step S2020), conflict determining section 150 causes the process to proceed to Step S2030. On the other hand, in a case where the request has not been simultaneously issued (No in Step S2020), conflict determining section 150 causes the process to proceed to Step S2040.

In Step S2030, conflict determining section 150 determines whether or not the role indicated by the request issued from second communication apparatus 200 is the second role (in other words, whether the roles conflict with each other).

In a case where such a role is the second role (Yes in Step S2030), conflict determining section 150 returns the process to the process illustrated in FIG. 4. In addition, at this time point, access request issuing section 140 may send transmission information (see FIGS. 2 and 3) in which the "connection response" and the "rejection" are set, as a response to the request from second communication apparatus 200. In addition, in a case where the requested role is not the second role (in other words, in the case of the first role), conflict determining section 150 causes the process to proceed to Step S2050.

In Step S2040, conflict determining section 150 determines whether or not the second request issued by first communication apparatus 100 is approved by second communication apparatus 200. This determination can be made based on whether or not the transmission information representing an approval for the second request has been replied within a predetermined time. In a case where the second request is approved (Yes in Step S2040), conflict determining section 150 proceeds to Step S2050.

In Step S2050, access control section 130 establishes a connection as the second role. In other words, first communication apparatus 100 maintains the role according to the second request that is issued by access request issuing section 140.

In Step S2100 illustrated in FIG. 4, access request issuing section 140 makes a request again in accordance with the capability of second communication apparatus 200. In other words, access request issuing section 140 sets a random time, for example, and issues either a first request or a second request. The reason for this is that, at this point of time, it is known that each one of first communication apparatus 100 and second communication apparatus 200 can serve both the first and the second roles. In addition, in a case where conflict occurs again, access request issuing section 140 may issue a request again.

In Step S1800, access control section 130 determines whether or not an instruction for the completion of the process has been made by user operation or the like. In a case where the instruction for the completion of the process has not been made (No in Step S1800), access request issuing section 140 returns the process to Step S1100 and waits for the issuance of a request from second communication apparatus 200 and the start of a session from first communication apparatus 100. In addition, in a case where the instruction for the completion of the process has been made (Yes in Step S1800), access request issuing section 140 completes a series of the process.

According to the operation described above, even when requests for determining the roles of first communication apparatus 100 and second communication apparatus 200 conflict with each other, the roles are dynamically settled. Thus, according to first communication apparatus 100, the establishment of a session can be realized using a small number of steps.

The operation of first communication apparatus 100 has been described thus far.

Hereinafter, examples of the operation of the entirety (hereinafter, referred to as a "communication system") of first communication apparatus 100 and second communication apparatus 200 will be described using three patterns.

A first pattern is a pattern of a case where the first requests conflict with each other, and first communication apparatus 100 can serve both the first and second roles, but second communication apparatus 200 can serve only the first role.

A second pattern is a pattern of a case where the first requests conflict with each other, and each one of first communication apparatus 100 and second communication apparatus 200 can serve both the first and second roles.

A third pattern is a pattern of a case where the first request and the second request are simultaneously issued.

Figure 7:
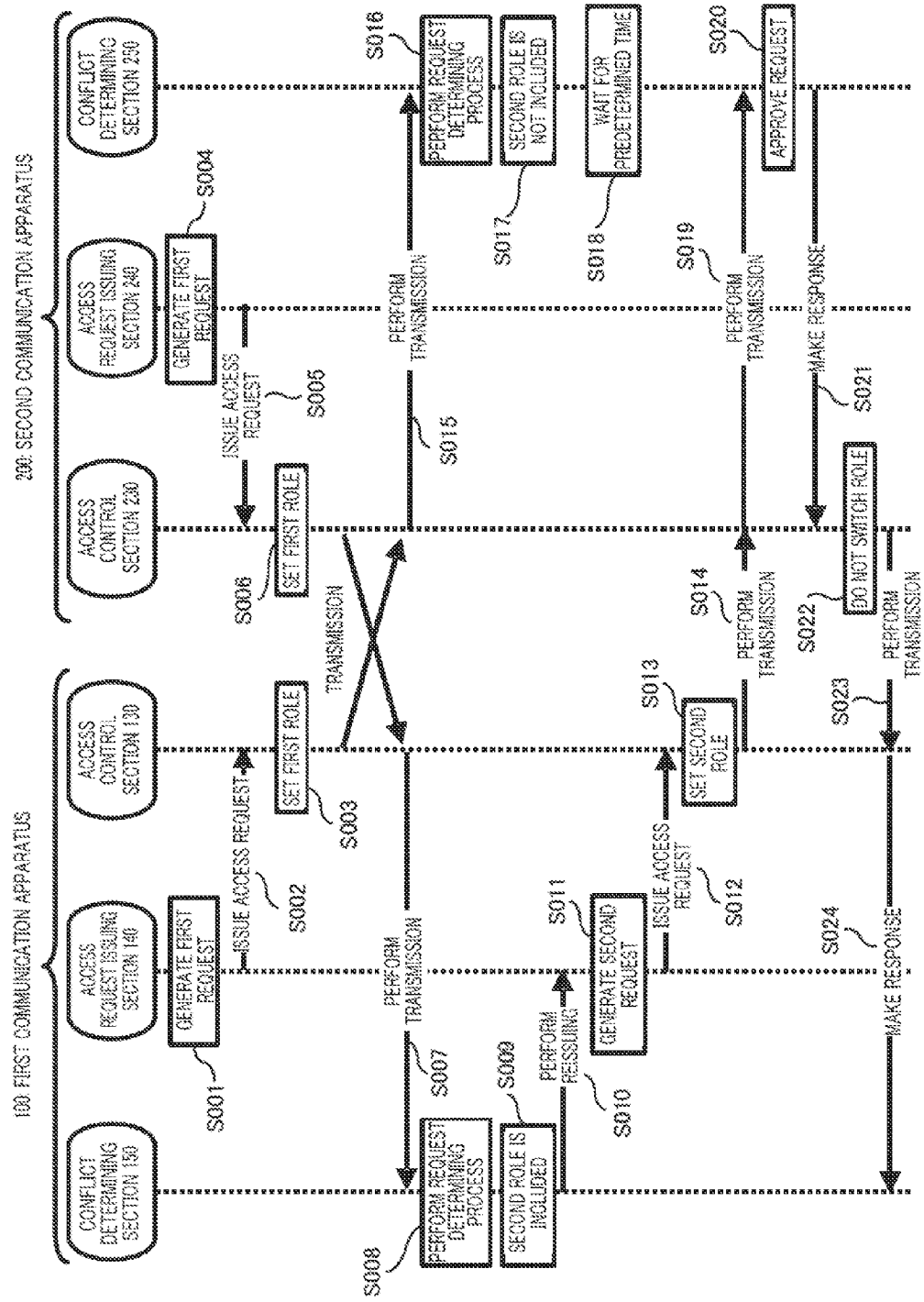
FIG. 7 is a sequence diagram that illustrates a first example of an operation of the communication system according to this embodiment.

FIG. 7 is a sequence diagram that illustrates an example of the operation of the communication system for the above-described first pattern.

Hereinafter, access control section 130, access request issuing section 140, and conflict determining section 150 of first communication apparatus 100 will be respectively referred to as "first access control section 130," "first access request issuing section 140," and "first conflict determining section 150." In addition, access control section 130, access request issuing section 140, and conflict determining section 150 of second communication apparatus 200 will be respectively referred to as "second access control section 230," "second access request issuing section 240," and "second conflict determining section 250."

As illustrated in FIG. 7, in order to start a session, first access request issuing section 140 generates a command of the first request (S001). Then, first access request issuing section 140 transmits the generated command of the first request to first access control section 130 (S002). First access control section 130 sets a first role as the role of first communication apparatus 100 (S003) and transmits the command to second communication apparatus 200.

At this time, it is assumed that second access request issuing section 240 generates the command of the first request for starting a session almost simultaneously with the request for starting a connection from first communication apparatus 100 described above (S004) and transmit the generated command of the first request to second access control section 230 (S005). Second access control section 230 sets the first role as the role of second communication apparatus 200 (S006) and transmits the command to first communication apparatus 100.

First access control section 130 that has received the command from second communication apparatus 200 transmits the received command to first conflict determining section 150 for analysis of the command (S007). First conflict determining section 150 starts a request determining process by referring to command type 315 of the received command. In this example, in the command received from second communication apparatus 200, similar to the first request that is issued by first communication apparatus 100, the "connection request" and the "first role" are set. In other words, second communication apparatus 200, similarly, issues the first request. Accordingly, first conflict determining section 150 detects a conflict state (S008).

Although not illustrated in the figure, first conflict determining section 150 may send a provisional response of the transmission information in which the "connection response" and the "rejection" are set as a response to the request from second communication apparatus 200 at this time point.

Next, first conflict determining section 150 checks whether the second role is included (S009) and requests first access request issuing section 140 to reissue the command of the second request in a case where the second role is included (S010). First access request issuing section 140 that has received the reissuance request generates a command of the second request (S011) and transmits the generated command of the second request to first access control section 130 (S012). First access control section 130 sets the second role as the role of first communication apparatus 100 again (S013) and transmits the command to second communication apparatus 200 (S014).

Second access control section 230 that has received the command from first communication apparatus 100 transfers the analysis of the command to second conflict determining section 250 (S015). Second conflict determining section 250 starts a request determining process by referring to command type 315 (see FIG. 2) of the received command. In this example, in the command received from first communication apparatus 100, similar to the first request issued by second communication apparatus 200, the "connection request" and the "first role" are set. In other words, first communication apparatus 100 similarly issues the first request. Accordingly, second conflict determining section 250, similar to first conflict determining section 150 described above, detects a conflict state (S016).

Although not illustrated in the figure, second conflict determining section 250 may make a provisional response of the transmission information in which the "connection response" and the "rejection" are set as a response to the request from first communication apparatus 100 at this time point.

Next, second conflict determining section 250 checks whether the second role is included (S017). In this example, since second communication apparatus 200 can serve only the first role, second communication apparatus 200 cannot reissue a request for switching the role and waits for a predetermined time (S018).

In a case where the command (the second request) has been received from first communication apparatus 100 within a predetermined time, second access control section 230 transfers the analysis of the command to second conflict determining section 250 (S019). Second conflict determining section 250 starts a request determining process by referring to command type 315 (see FIG. 2) of the received command. In this example, in the command received from first communication apparatus 100, similar to the first request issued by second communication apparatus 200, the "connection request" is set, but, unlike the first request, the "the second role" is set. Accordingly, second conflict determining section 250 detects no occurrence of the conflict state, accepts the request (S020), in other words, allows access request issuing section 240 to accept the request from first communication apparatus 100, and makes a response (S021). Second access control section 230 that has received the response transmits the command of the response as is to first communication apparatus 100 (S023).

At this time, since the role is not changed from the first role that has been set in advance in Step S006, second access control section 230 determines the role of second communication apparatus 200 as the first role as is (S022).

First access control section 130 that has received the response from second communication apparatus 200 notifies first conflict determining section 150 of the response. As a result, the role of first communication apparatus 100 is determined to be the second role (S024).

In addition, an operation acquired by removing Steps S001 to S003 and S015 to S018 from that illustrated in FIG. 7 is the operation performed in a case where there is a one-way request from second communication apparatus 200.

First communication apparatus 100 and second communication apparatus 200 can set their respective requests to result in a non-conflicting combination of the first and second roles based on such operations in a case where only one of the apparatuses can serve the second role. In this way, first communication apparatus 100 and second communication apparatus 200 can settle a combination of such requests in a case where there is a one-way request that does not coincide with the capability of the other party or in a case that requests from both parties conflict with each other. In FIG. 7, although an operation of a case where the first requests conflict with each other has been described, the same applies to a case where the second requests conflict with each other.

Figure 8:
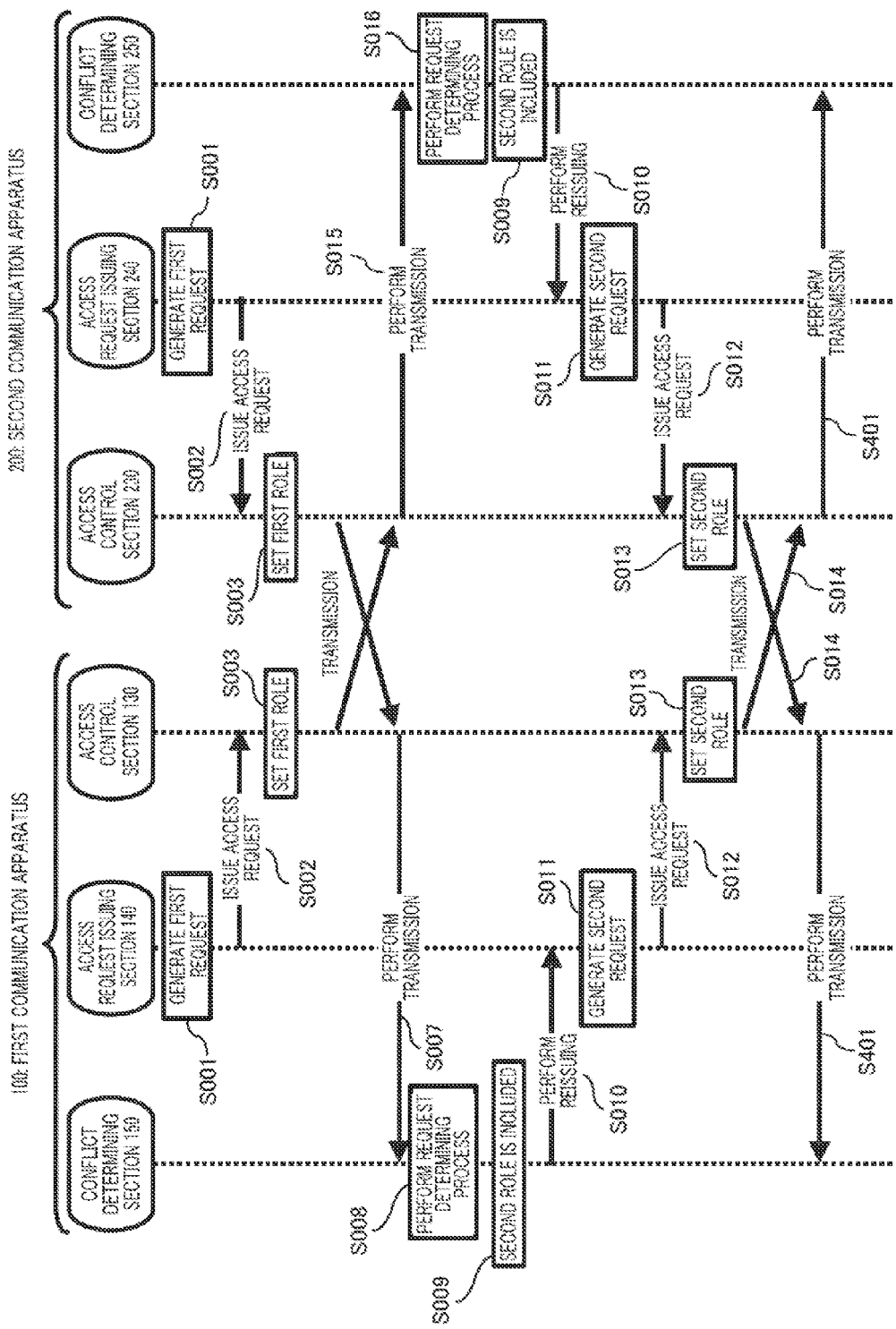
FIG. 8 is a sequence diagram that illustrates a second example of the operation of the communication system according to this embodiment.

FIG. 8 is a sequence diagram that illustrates an example of the operation of the communication system for the second pattern described above.

The operation of first communication apparatus 100 up to Step S014 and the operation of second communication apparatus 200 up to Step S016 are the same as those illustrated in FIG. 7. In this example, second communication apparatus 200 can serve the second role as well and thus perform the same operation as that of first communication apparatus 100 up to Step S014.

A difference from the series of the operations described with reference to FIG. 7 is a part in which first communication apparatus 100 and second communication apparatus 200 detect the conflict of the second requests that are reissued after the conflict of the first requests is detected (S401).

In other words, the requests conflict with each other twice in this example. However, at this time point, first communication apparatus 100 and second communication apparatus 200 can know that the apparatuses have both the first and second roles.

In a case where each one of both communication apparatuses can serve two roles, first communication apparatus 100 and second communication apparatus 200 can reach the relationship of the second requests based on the operation. In addition, at this time point, first communication apparatus 100 and second communication apparatus 200 can know that the apparatuses can serve both of the roles. Accordingly, for example, first communication apparatus 100 and second communication apparatus 200 wait for a predetermined time and then issue requests for roles that can be surely accepted by the other party, thereby establishing a connection.

In other words, first communication apparatus 100 and second communication apparatus 200 can establish a connection without mutually exchanging roles that the respective apparatuses are capable of serving, using some kind of means in advance.

Figure 9:
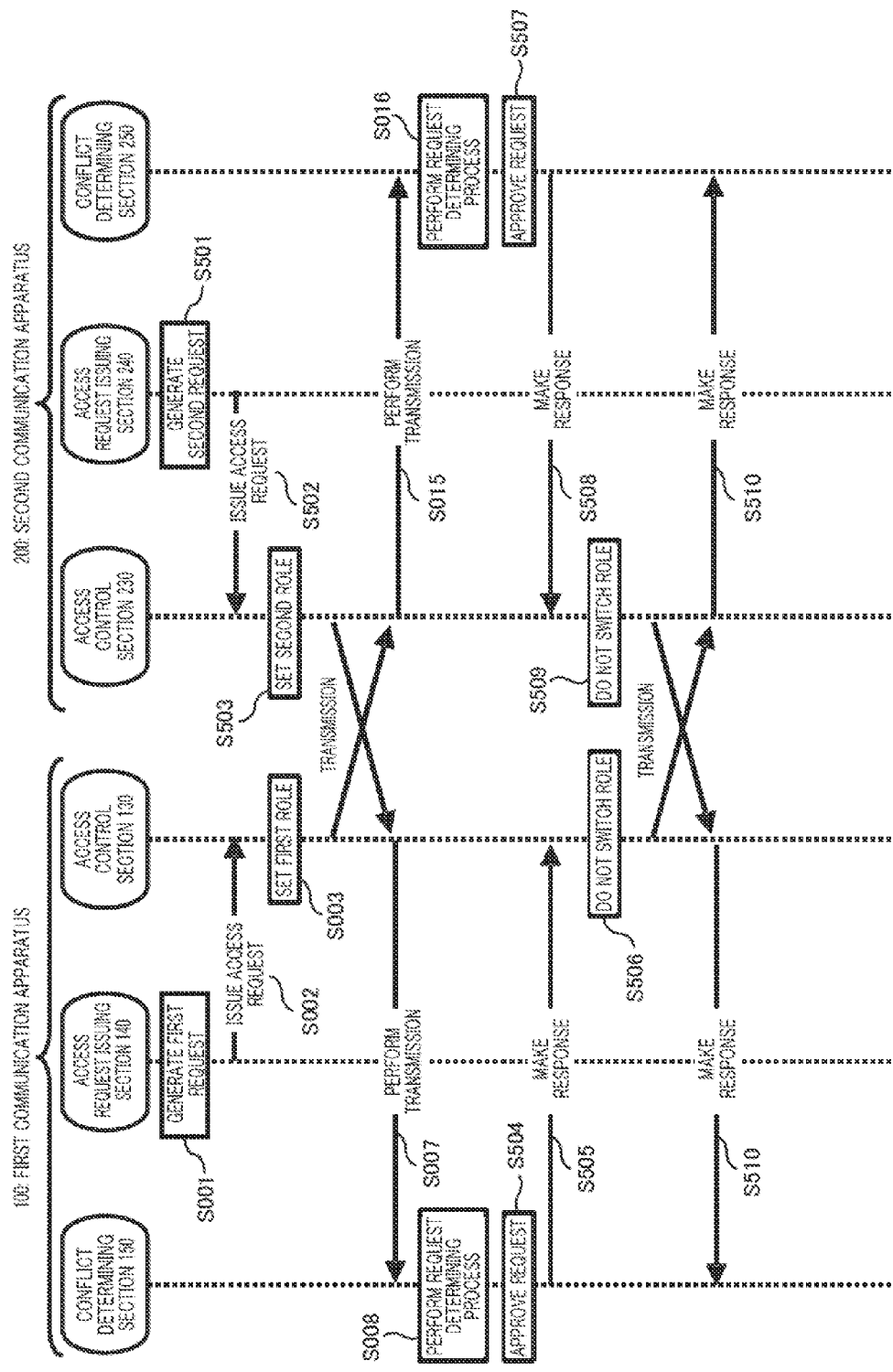
FIG. 9 is a sequence diagram that illustrates a third example of the operation of the communication system according to this embodiment.

FIG. 9 is a sequence diagram that illustrates an example of the operation of the communication system for the third pattern described above.

First access request issuing section 140 generates a command of the first request for starting a session (S001) and transmits the generated command of the first request to first access control section 130 (S002). First access control section 130 sets the first role as the role of first communication apparatus 100 (S003) and transmits the command to second communication apparatus 200.

At this time, it is assumed that second access request issuing section 240 generates a command of the second request for starting a session almost simultaneously with the request for starting a connection from first communication apparatus 100 described above (S501) and transmits the generated command of the second request to second access control section 230 (S502). Second access control section 230 sets the second role as the role of second communication apparatus 200 (S503) and transmits the command to first communication apparatus 100.

First access control section 130 that has received the command from second communication apparatus 200 transmits the received command to first conflict determining section 150 for analysis of the command (S007). First conflict determining section 150 starts a request determining process by referring to command type 315 (see FIG. 2) of the received command. In this example, in the command received from second communication apparatus 200, similar to the first request that is issued by first communication apparatus 100, the "connection request" is set, but, differently from the first request, a "second role" is set. Accordingly, first conflict determining section 150 detects that a conflict state with second communication apparatus 200 does not occur (S008). Then, first conflict determining section 150 accepts the request (S504) and makes a response (S505).

Access control section 130 that has received the response transmits a command of the response as is to second communication apparatus 200. At this time, since the role is not changed from the first role set in Step S003 in advance, access control section 130 determines the role of first communication apparatus 100 as the first role as is (S506).

Similarly, second access control section 230 that has received the command from first communication apparatus 100 transmits the received command to second conflict determining section 250 for analysis of the command (S015). Second conflict determining section 250 starts a request determining process by referring to command type 315 (see FIG. 2) of the received command. In this example, in the command received from first communication apparatus 100, similar to the second request that is issued by second communication apparatus 200, the "connection request" is set, but differently from the second request, the "first role" is set. Accordingly, second conflict determining section 250 detects that a conflict state with first communication apparatus 200 does not occur (S016). Then, second conflict determining section 250 accepts the request (S507) and makes a response (S508).

Second access control section 230 that has received the response transmits the command of the response as is to first communication apparatus 100. At this time, since the role is not changed from the second role that has been set in advance in Step S503, second access control section 230 determines the role of second communication apparatus 200 as the second role as is (S509).

As a result, first communication apparatus 100 and second communication apparatus 200 mutually receive replies, thereby establishing a connection (S510).

In accordance with such operations, even in a case where the respective requests are simultaneously generated, first communication apparatus 100 and second communication apparatus 200 can establish the connection as is as long as the contents of the requests are different from each other.

As above, first communication apparatus 100 according to this embodiment can issue a request to serve the other role in accordance with the roles that first communication apparatus 100 is capable of serving, in a case where the request issued by first communication apparatus 100 and the request issued by second communication apparatus 200 conflict with each other. In other words, first communication apparatus 100 according to this embodiment can settle the roles by dynamically switching the role of first communication apparatus 100 so as to result in a non-conflicting combination even when the request from first communication apparatus 100 and the request from second communication apparatus 200 conflict with each other. Accordingly, first communication apparatus 100 can establish a session with second communication apparatus 200 using a small number of steps.

In the description above, the terms the "first role" and the "second role" have been used. In a case where one of these terms is used to mean the role served as a host and the other one of the terms is used to mean the role served as a device, the advantages of the present invention are as follows.

The communication apparatus according to the present invention can set the respective roles to result in a non-conflicting combination of the request as a host and the request as a device in a case where only one communication apparatus can serve the role as a host. Accordingly, the communication apparatus according to the present invention can realize the establishment of a session as is.

On the other hand, in a case where both communication apparatuses can serve the role as a host, the communication apparatus according to the present invention can be made to result in the relationship of requests for the hosts. In such a case, while it is necessary to settle the conflict between requests for the role as a host, at this time point, the communication apparatus according to the present invention can know that the each apparatus can serve the role as a device. Therefore, according to the communication apparatus of the present invention, there is no need to exchange the roles that each communication apparatus is capable of serving, using some kind of means in advance.

In addition, according to the communication apparatus of the present invention, when both communication apparatuses do not have the role as a host, the communication apparatuses cannot make a request for the host. Accordingly, the communication apparatus according to the present invention can know that the role as a host cannot be served by any one of the communication apparatuses by the detection of time-out or the like. Therefore, the communication apparatus according to the present invention can know that the continuation of the subsequent connection processes is not necessary and thus can avoid further unnecessary steps.

Furthermore, the description in the above-described embodiment has been made in connection with that a request to serve the other role in accordance with the role that the communication apparatus is capable of serving is reissued in a case where two requests that are simultaneously issued conflict with each other and a case where the issued requests are rejected. However, the present invention is not limited to this case. In other words, the communication apparatus may be configured to reissue a request to serve the other role in accordance with the role that the communication apparatus is capable of serving, only in one of these two cases.

The disclosure of Japanese Patent Application No. 2011-162002, filed on Jul. 25, 2011, including the specification, drawings and abstract, is incorporated herein by reference in its entirety.

INDUSTRIAL APPLICABILITY

The present invention is useful as a communication apparatus, a communication method, and a communication program capable of determining the role of each communication apparatus using a small number of steps. The present invention can be applied to a personal computer, and portable apparatuses such as a cellular phone and a tablet PC, for example.

REFERENCE SIGNS LIST

100 First communication apparatus
110, 210 Communication section
120, 220 Data storing section
130, 230 Access control section
140, 240 Access request issuing section
150, 250 Conflict determining section
200 Second communication apparatus

The invention claimed is:

1. A communication apparatus including a data storing section and being capable of serving at least one of a role as a device for allowing another communication apparatus at a position remote from the communication apparatus to access the data storing section and a role as a host for accessing a data storing section included in the other communication apparatus, the communication apparatus comprising:
an access control section that controls the role to be served by the communication apparatus;
an access request issuing section that issues, to the other communication apparatus, a request that the communication apparatus serve one of the roles that the communication apparatus is capable of serving;
an acquisition section that acquires a request issued by the other communication apparatus and that acquires a response to the request issued by the access request issuing section; and
a conflict determining section that issues, to the other communication apparatus via the access request issuing section, without exchanging capability information with the other communication apparatus in advance, a request that the communication apparatus serves the other role when the communication apparatus is capable of serving the other role, in at least one of a case where the request issued by the access request issuing section and the request issued by the other communication apparatus conflict with each other and a case where the request issued by the access request issuing section is rejected.

2. The communication apparatus according to claim 1, wherein, when the other communication apparatus issues a request that the other communication apparatus serves one of the two roles and when this request issued by the other communication apparatus and the request issued by the access request issuing section do not conflict with each other, the conflict determining section causes the access request issuing section to approve the request from the other communication apparatus.

3. The communication apparatus according to claim 1, wherein, when the request issued by the access request issuing section and the request issued by the other communication apparatus conflict with each other and when the communication apparatus is not capable of serving the other role, the conflict determining section waits for the other communication apparatus to issue a request that the other communication apparatus serves the other role and causes the access request issuing section to approve the request that the other communication apparatus serve the other role, when the request is issued by the other communication apparatus.

4. A communication method in a communication apparatus including a data storing section and being capable of serving at least one of a role as a device for allowing another communication apparatus at a position remote from the communication apparatus to access the data storing section and a role as a host for accessing a data storing section included in the other communication apparatus, the communication method comprising:
issuing, to the other communication apparatus, a request that the communication apparatus serves one of the roles that the communication apparatus is capable of serving;
acquiring a request issued by the other communication apparatus, and acquiring a response from the other communication apparatus to the request issued by the communication apparatus;
determining whether or not the request issued by the communication apparatus and the request issued by the other communication apparatus conflict with each other;
issuing, to the other communication apparatus, without exchanging capability information with the other communication apparatus in advance, a request that the communication apparatus serves the other role when the communication apparatus is capable of serving the other role, in at least one of a case where the request issued by the communication apparatus and the request issued by the other communication apparatus conflict with each other and a case where the request issued by the communication apparatus is rejected; and
controlling the role to be served by the communication apparatus in accordance with the response from the other communication apparatus to the request issued by the communication apparatus.

5. A communication program stored on a non-transitory computer-readable medium causing a computer of a communication apparatus to execute processes, the communication apparatus including a data storing section and being capable of serving at least one of a role as a device for allowing another communication apparatus located at a position remote from the communication apparatus to access the data storing section and a role as a host for accessing a data storing section included in the other communication apparatus, the communication program causing the computer of the communication apparatus to execute the processes comprising:

issuing, to the other communication apparatus, a request that the communication apparatus serves one of the roles that the communication apparatus is capable of serving;

acquiring a request issued by the other communication apparatus, and acquiring a response from the other communication apparatus to the request issued by the communication apparatus;

determining whether or not the request issued by the communication apparatus and the request issued by the other communication apparatus conflict with each other;

issuing, to the other communication apparatus, without exchanging capability information with the other communication apparatus in advance, a request that the communication apparatus serves the other role when the communication apparatus is capable of serving the other role, in at least one of a case where the request issued by the communication apparatus and the request issued by the other communication apparatus conflict with each other and a case where the request issued by the communication apparatus is rejected; and controlling the role to be served by the communication apparatus in accordance with the response from the other communication apparatus to the request issued by the communication apparatus.

* * * * *